United States Patent [19]
Woods

[11] Patent Number: 6,125,587
[45] Date of Patent: *Oct. 3, 2000

[54] VEHICULAR BACK WINDSHIELD ASSEMBLY WITH RETRACTABLE AUXILIARY WINDOW

[76] Inventor: Solomon Woods, 11476 Newgate La., Cincinnati, Ohio 45240

[*] Notice: This patent issued on a continued prosecution application filed under 37 CFR 1.53(d), and is subject to the twenty year patent term provisions of 35 U.S.C. 154(a)(2).

[21] Appl. No.: 09/095,037

[22] Filed: Jun. 10, 1998

[51] Int. Cl.[7] ........................................................ B60J 1/16
[52] U.S. Cl. .................................................. 49/374; 49/404
[58] Field of Search ............................... 49/380, 360, 374, 49/404, 413, 168, 169, 63; 296/149, 146.16

[56] References Cited

U.S. PATENT DOCUMENTS

| | | | |
|---|---|---|---|
| 1,388,091 | 8/1921 | Bresnahan | 49/169 |
| 1,721,233 | 7/1929 | Kern | 49/169 |
| 3,770,312 | 11/1973 | Shadburn . | |
| 4,034,509 | 7/1977 | DeRees | 49/374 |
| 4,124,054 | 11/1978 | Spretnjak . | |
| 4,671,013 | 6/1987 | Friese et al. | 49/380 |
| 4,760,872 | 8/1988 | Hale, Jr. | 49/168 |
| 4,793,099 | 12/1988 | Friese et al. | 49/380 |
| 5,442,880 | 8/1995 | Gipson | 49/413 |
| 5,505,023 | 4/1996 | Gillen et al. | 49/413 |
| 5,724,771 | 3/1998 | Gipson | 49/413 |
| 5,799,444 | 9/1998 | Freimark et al. | 49/413 |
| 5,809,706 | 9/1998 | Neaux | 49/374 |

*Primary Examiner*—Daniel P. Stodola
*Assistant Examiner*—Curtis A. Cohen
*Attorney, Agent, or Firm*—Charles R. Wilson

[57] ABSTRACT

A back windshield assembly for a vehicle comprises a windshield with an irregular top edge opening and a retractable auxiliary window. The auxiliary window is configured to cover the opening when in a fully closed position. The auxiliary window is movable from the fully closed position to an at least partially open position. The assembly is pleasing to the eye and is functional in allowing access to an area of the vehicle directly behind it.

16 Claims, 6 Drawing Sheets

VEHICULAR BACK WINDSHIELD ASSEMBLY WITH RETRACTABLE AUXILIARY WINDOW

FIELD OF THE INVENTION

This invention relates to a back windshield assembly for a vehicle. More particularly, the invention relates to a vehicular back windshield assembly having a vertically retractable auxiliary window.

BACKGROUND OF THE INVENTION

Motorized vehicles such as autos, vans, sport utility vehicles, and pick-up trucks have a back windshield. The windshield is a one piece glass structure which extends laterally across the back of the vehicle. It is immovable. Its primary purpose is to allow the vehicle's driver to view the following traffic.

Certain newer pick-up trucks have a back windshield with a slidable auxiliary window. The auxiliary window slides laterally a few inches to vent air or allow limited access to an area directly behind the auxiliary window. Such auxiliary windows are functional. That is, they are generally rectangular in shape and are not meant to be aesthetically pleasing in appearance. Also, the substantially straight edges of the auxiliary window is conducive to the lateral sliding motion such windows possess.

There is a need for a more stylized auxiliary window operably associated with a back windshield of a vehicle than heretofore known. Specifically, an auxiliary window with an irregularly shaped and specifically a curved edge portion and which is movable relative to the back windshield to create an opening is now available. In accord with a need for advanced motor vehicle styling needs, there has been developed a back windshield assembly with a vertically retractable auxiliary window having an irregular top edge for appearance purposes. The back windshield and auxiliary window present a new vehicle look, which is aesthetically pleasing.

SUMMARY OF THE INVENTION

A vehicular back windshield assembly includes a vertically retractable auxiliary window. The back windshield assembly 10 comprises a back windshield with at least one opening and a retractable auxiliary window operably associated with each opening. The auxiliary window can be used to fully close off the opening or the auxiliary window can be vertically retracted to at least partially expose the opening and create a passageway. The opening has an irregular shaped top edge. The auxiliary window is similarly shaped. The auxiliary window is mounted for manual, mechanical or electrical movement ranging from the fully closed position to the fully open position.

DETAILED DESCRIPTION OF THE INVENTION

The back windshield assembly of the invention is particularly useful on pick-up trucks and is described in detail in the following paragraphs. The back windshield assembly, though can be used with other vehicle styles and such uses are contemplated.

Figure 1:
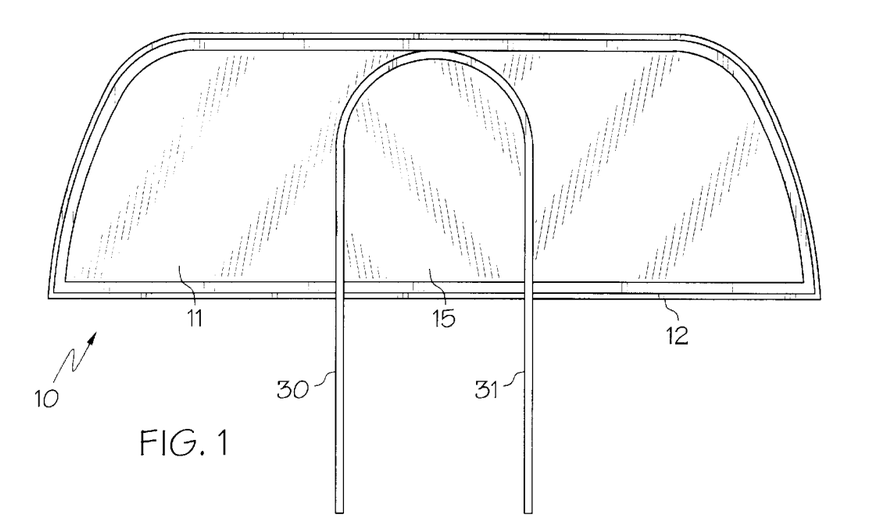
FIG. 1 is a front elevational view of a back windshield assembly of the invention wherein an auxiliary window of the assembly is in a fully closed position.
Figure 2:
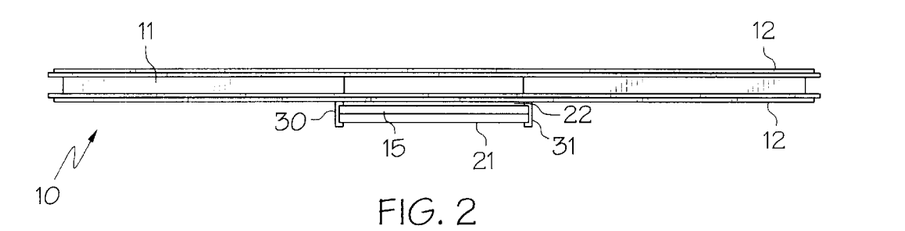
FIG. 2 is a top plan view of the back windshield assembly of FIG. 1.
Figure 3:
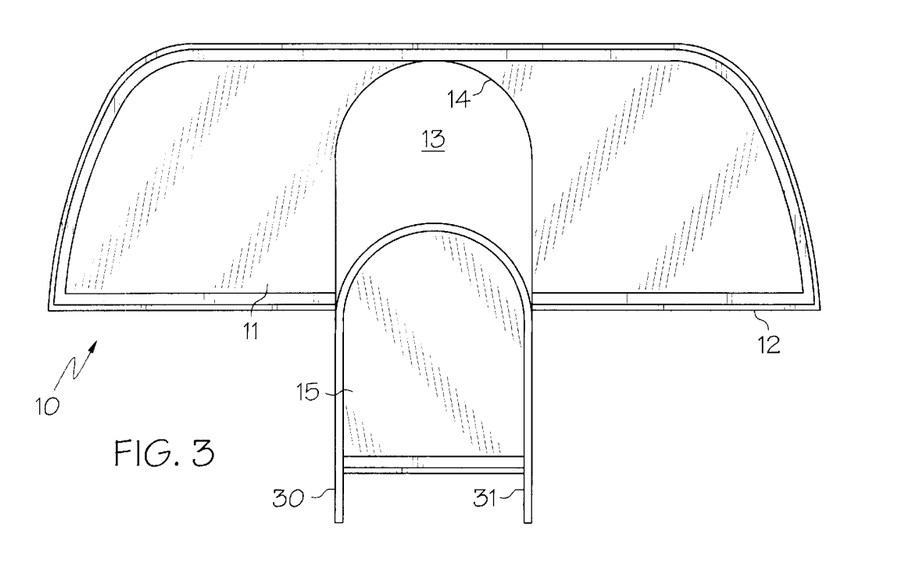
FIG. 3 is a front elevational view of the back windshield assembly of FIG. 1 wherein the auxiliary window is partially open.

With reference to FIGS. 1–3, there is shown a back windshield assembly 10 of the invention. The assembly comprises a back windshield 11 which extends substantially across the back of the vehicle. The windshield is permanently mounted in the vehicle. A conventional edge molding 12 is used to help hold it in place. An opening 13 is cut into the windshield in an approximate mid-section. As best seen in FIG. 3, the opening has a curved top edge 14 which extends downwardly on both sides to a bottom peripheral edge of the back windshield edge. An auxiliary window 15 is mounted to be in operable association with the opening 13. As seen FIG. 1, the auxiliary window 15 is in a fully closed position. As seen in FIG. 3, the auxiliary window 15 is in an approximate three quarter open position. Other more closed, more partially open and fully open positions are possible as readily imagined and further discussed below.

The back windshield 11 is a single piece of safety glass. It can be substantially flat or slightly curved, especially at left and right side areas. It can be clear glass, tinted glass or blackened glass. It can as well be a rigid synthetic plastic piece used in place of glass. In all cases, the windshield further has at least one opening 13 to accommodate the auxiliary window 15. The opening 13 best seen in FIG. 2 is arch-shaped. Its top edge is rounded to form a smooth curve. Its side edges extend from the curve substantially vertically downwardly. The opening 13 is about eight inches to about eighteen inches wide at its base and about ten inches to about twenty inches in height.

Other opening sizes and shapes are feasible. For example, the opening size will normally be smaller when there are multiple openings across the back windshield. Two openings and even three openings substantially equi-spaced in the back windshield are possible. The shape of the opening also can be changed according to styling desires. An opening with a less curved top edge and side edges which extend down and outwardly at about thirty degrees to about forty-five degrees to the vertical can be used. A top window portion comprised of a series of straight edges is also possible. For example, a top edge which has the appearance of a truncated triangle gives a pleasing appearance. Still other irregular shaped top edges and side edges are contemplated.

Figure 5:
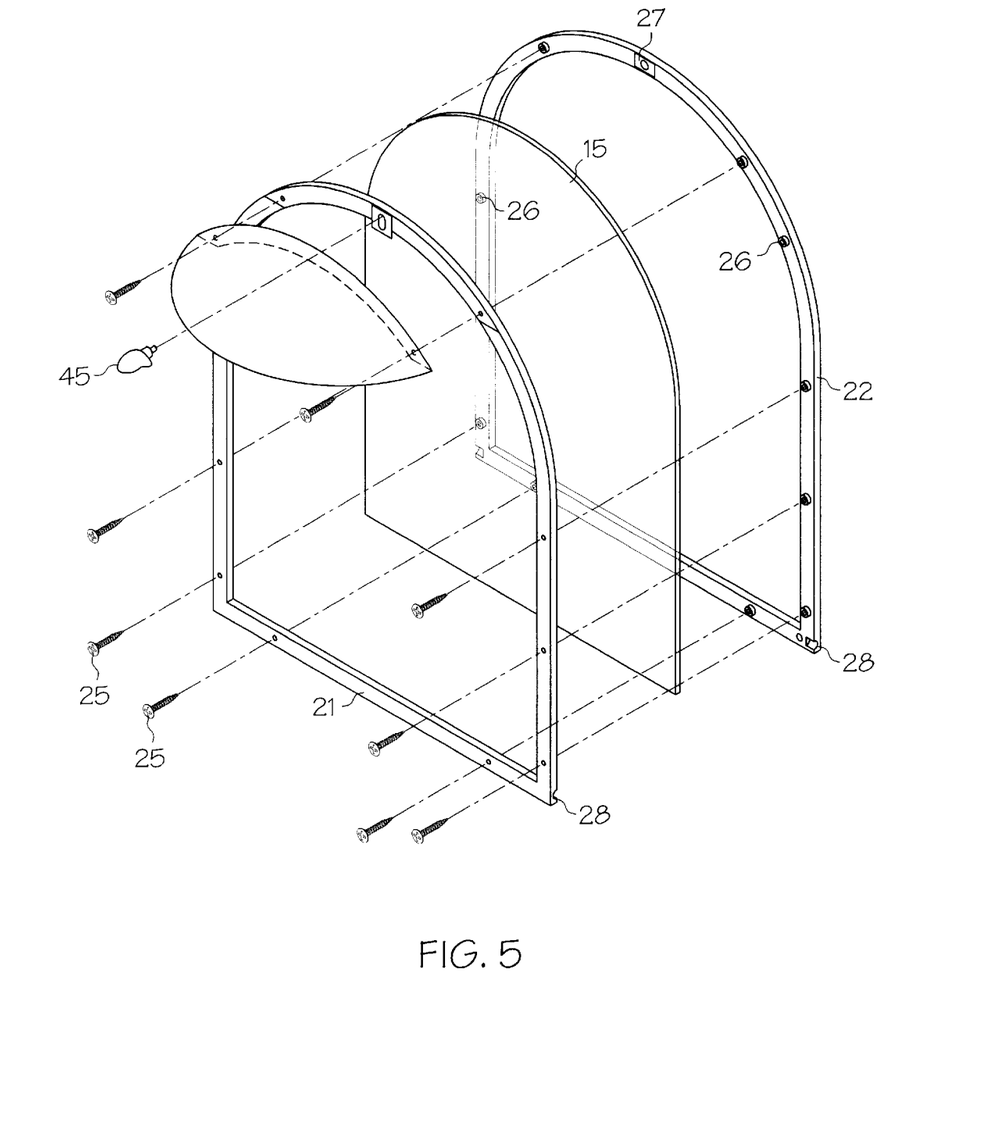
FIG. 5 is an exploded view of the auxiliary window of FIG. 4.

The auxiliary window 15 has substantially the same size and configuration as the opening 13. The window 15 further has a frame casing 20 which facilitates its movement relative to the opening 13. The frame casing 20 includes a front frame cover plate 21 and a mating back frame support plate 22 which together trap the auxiliary window 15 therebetween. A holding means securely holds the frame plates 21 and 22 and auxiliary window 15 together. As seen in FIG. 5, a set of screws 25 and permanently mounted screw receptacles 26 are used as the holding means. A spacer 27 at the top of the frame cover plate and back frame support plate helps to properly maintain the frame casing. A set of frame alignment tabs 28 at the bottom corners of the plates is used to align the frame. A bore hold in each of the tabs guides the lateral movement of the 25 latch pins.

In accord with this invention, the auxiliary window 15 moves vertically relative to the back windshield. It moves from the fully closed position depicted in FIG. 1 to a fully open position where the window extends below the back windshield. Any means can be used to effect the movement. Manual movement with latch means to retain a selected window position is preferred and is depicted in the drawings. A detailed description of this preferred movement means follows. Other means to effect movement of the auxiliary window can be utilized. For example, a mechanical system with a crank arm can be used. An electrical system with push button activation means can also be used. Components necessary to accomplish the window movement and appropriate control means are known and can be routinely applied to accomplish the objective of the invention.

A latch system for the auxiliary window in the back windshield assembly includes a set of frame rails 30 and 31 mounted below the back windshield, a thumb button mechanism 32 mounted on the frame casing of the auxiliary window, latch pin mechanisms 33 mounted on the auxiliary window frame casing and further in operable association with the frame rails, and a cable 34 operably 20 connecting the thumb button mechanism to the latch pin mechanisms. Each of the components of the latch system is described in detail below.

Figures 6, 7:
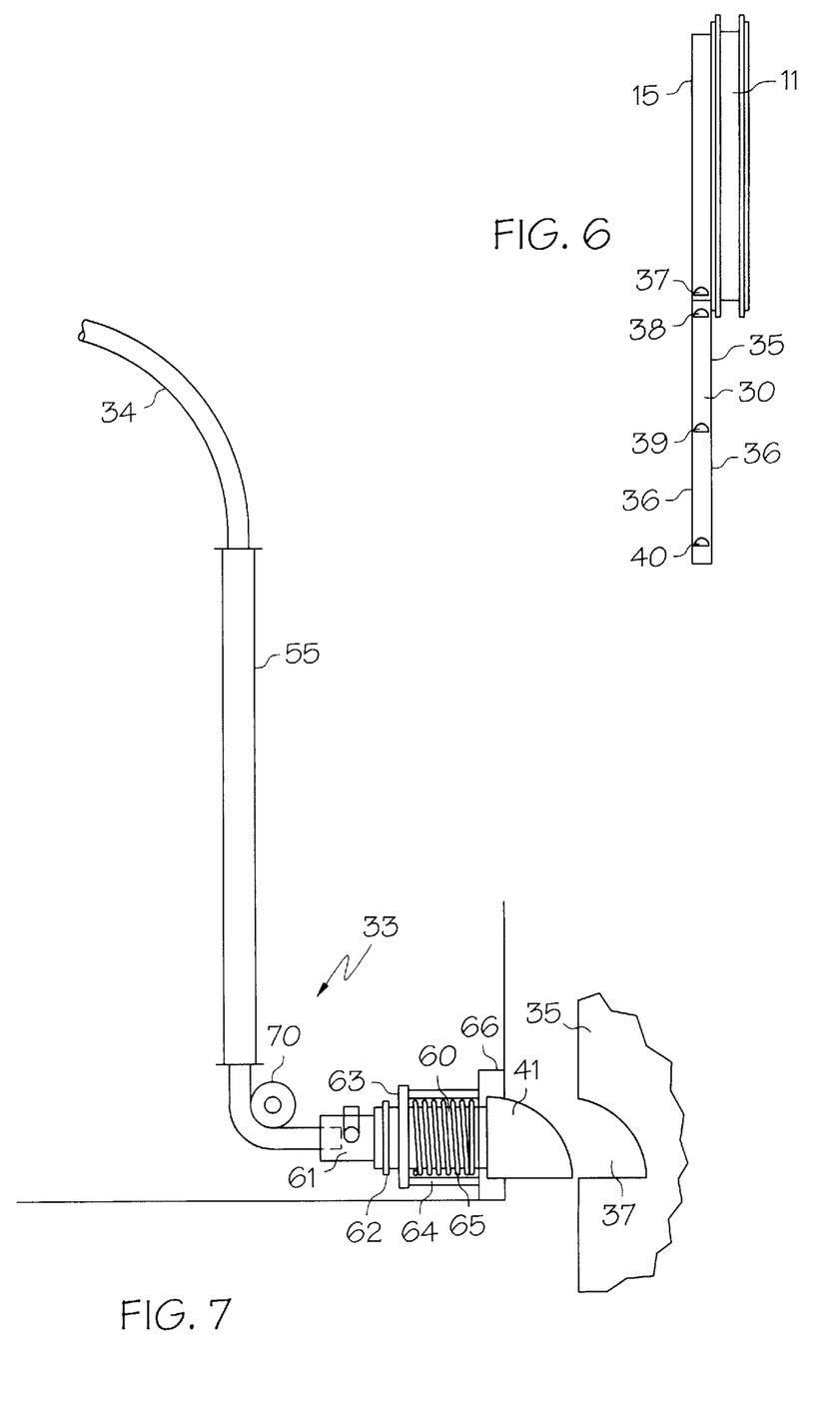
FIG. 6 is a side elevational view of a rail used with latch system for the auxiliary window of the back windshield system of the invention.
FIG. 7 is a front elevational view of the back windshield assembly of FIG. 1 showing in detail a latch pin mechanism for the auxiliary window.

The frame rails are permanently mounted to the vehicle directly below the opening 13 of the back windshield 11. Each rail is C-shaped with a back wall 35 and two side walls 36 extending inwardly at substantial right angles thereto. The rails are dimensioned to receive the auxiliary window 15 and allow it to slide within a channel formed by the rail's back and side walls. The back walls 35 of the channel have a set of latch detents 37–40 to receive latch pins 41. At least two detents are provided. An upper detent 37 is used to position the auxiliary window in a fully closed position. A lower detent 40 is used to hold the auxiliary window in a fully open position. Intermediate detents 38 and 39 are used to hold the auxiliary window in partially open positions. As evident in FIG. 6, four detents are substantially equi-spaced along the back wall of the frame rails representing open, one quarter open, three quarters open and closed window positions. As readily understood, more detents can be used to provide more window positions, though generally the four depicted detent positions are adequate and are preferred.

The auxiliary window 15 is manually movable from the fully closed position shown in FIG. 1 to a fully open position, including the partially open position of FIG. 3. To effect the movement, the frame rails mounted in the back of the vehicle directly below the auxiliary window are used to slideably receive the auxiliary window and its frame casing. The rails 30 and 31 are permanently mounted in the vehicle. The set of detents are positioned vertically along the rails to receive a latch pin found on the auxiliary window's frame.

Figure 4:
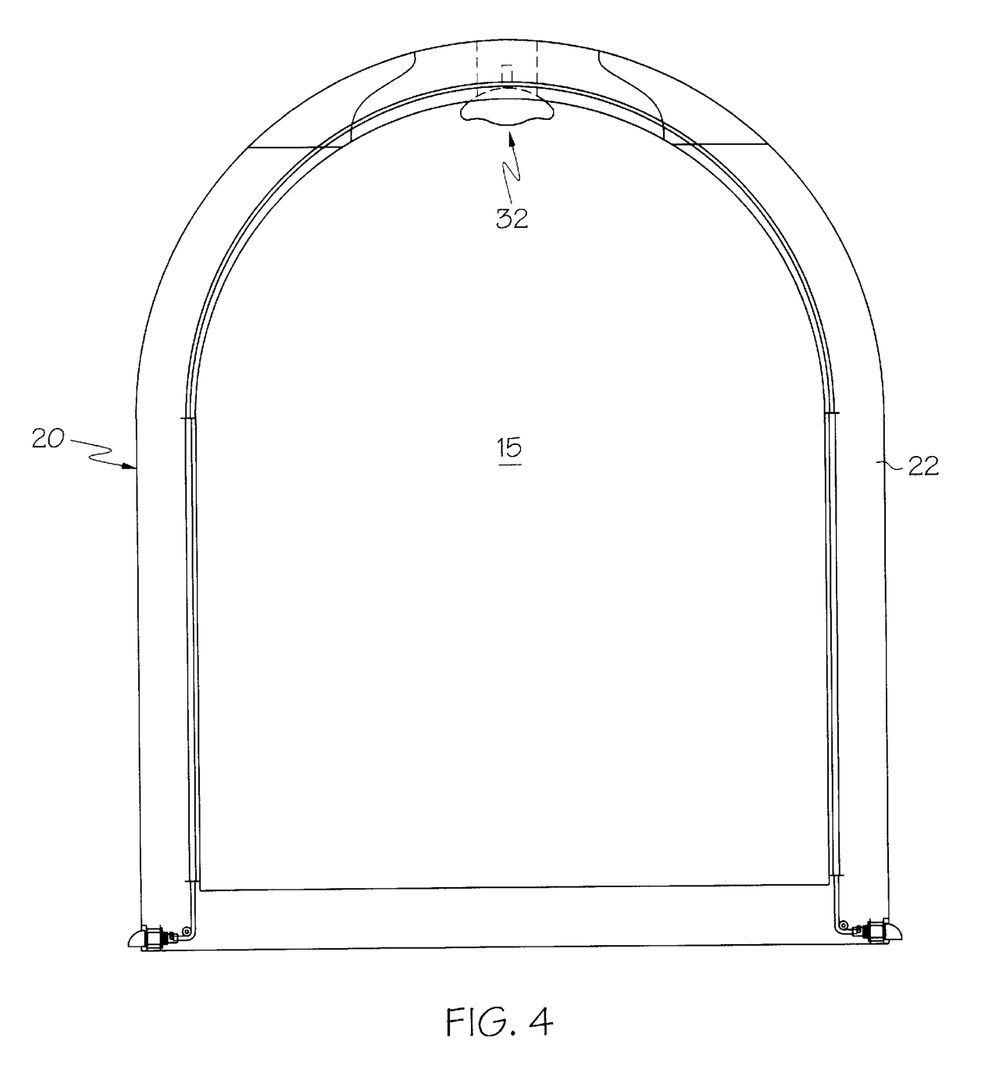
FIG. 4 is a front elevational view of the auxiliary window isolated from the back windshield assembly of FIG. 1.

With reference to FIGS. 4–11, the latch system on the auxiliary window comprises the thumb button mechanism 32 mounted at a top of the frame casing for the auxiliary window, a latch pin mechanism 33 mounted on a lower left and lower right portions of the frame casing and a continuous cable 34 which is moved by activation of the thumb button mechanism and is attached at each terminus to the latch pin mechanisms. As seen in FIG. 4, the thumb button mechanism is secured to the auxiliary window frame in an uppermost centered area. As positioned, it is readily reached by the vehicle's driver to lower the window and also to raise the window. Simply reaching back over the shoulder allows the driver to lift up on the thumb button and move the auxiliary window. This driver manipulation is easier than that needed with the current laterally sliding auxiliary windows. Necessarily, the easier driver manipulation to move the window translates into enhanced driver safety.

Figure 8:
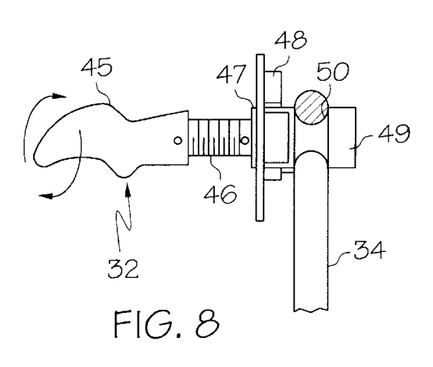
FIG. 8 is a side elevational view of a thumb button mechanism found on the back windshield assembly of FIG. 1.
Figure 9:
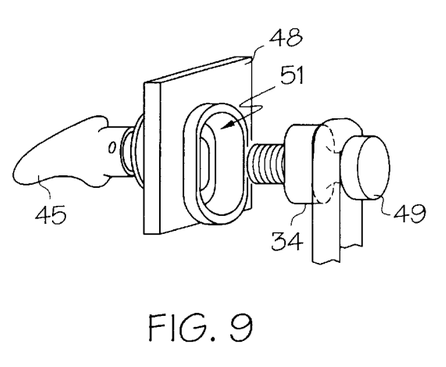
FIG. 9 is an exploded view of the thumb button mechanism of FIG. 8.
Figure 10:
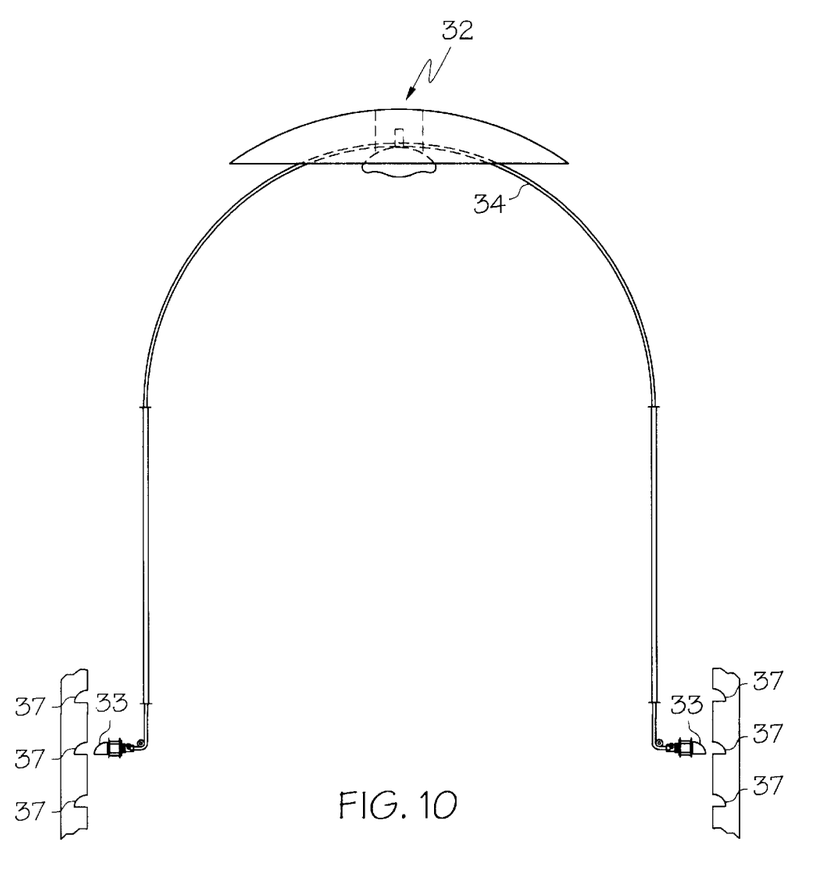
FIG. 10 is a schematic of the latch system for the auxiliary window of the back windshield assembly of FIG. 1.
Figure 11:
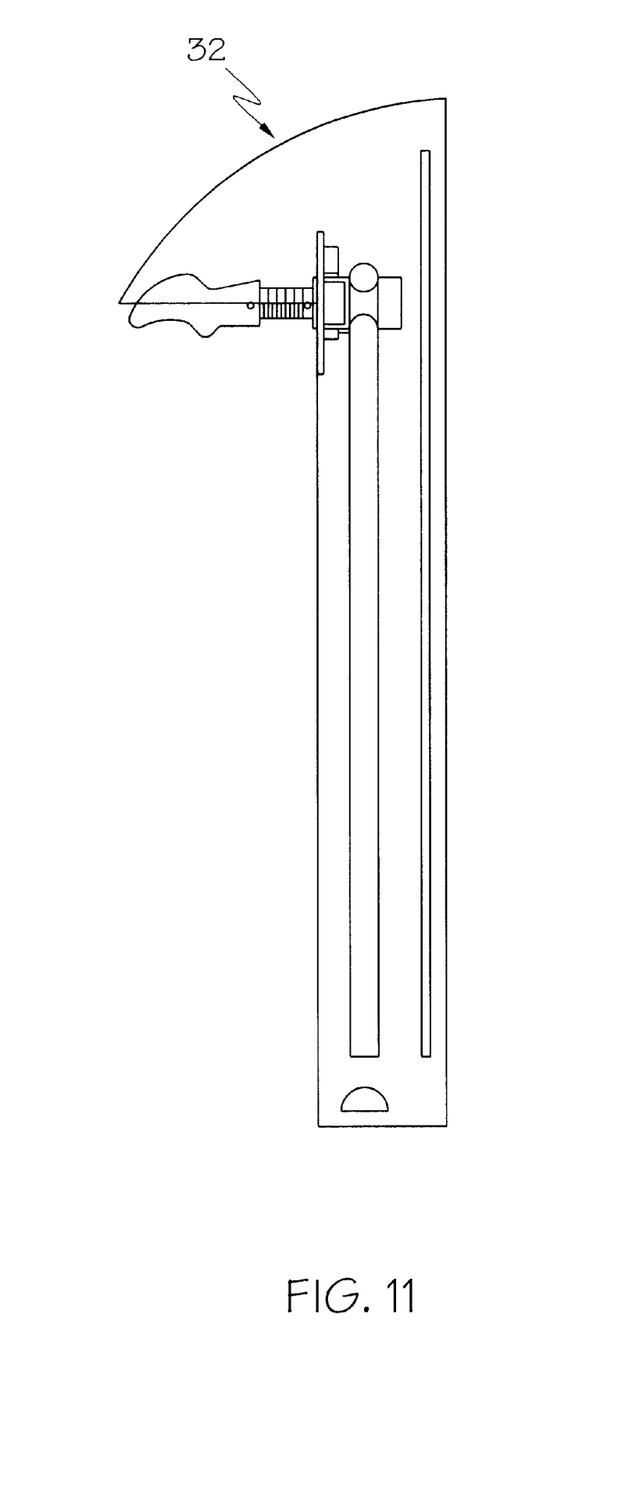
FIG. 11 is a side elevational view of the latch system for the auxiliary window of the back windshield assembly of FIG. 1.

With reference to FIGS. 8 and 9, the thumb button mechanism includes a thumb button 45, a threaded shank 46, a washer 47, a slide guide 48 and a cable knob 49 with an annular groove 50 for accommodating a cable. The slide guide is a plate with a vertically extending slot 51. The slide guide is permanently mounted on the window front frame plate. The thumb button 45 is screwed onto the threaded shank 46 and the shank inserted into the slot 51 of the slide guide 48. The shank is also threaded onto the cable knob 49 at its other end. As readily imagined and further as discussed with respect to operation of the auxiliary window, the thumb button 45 is used to move the shank vertically in the slot of the slide guide to raise the cable 34 and release the latch pins 41 as a prelude to moving the auxiliary window 15.

The cable 34 extends from a left latch pin mechanism 33, over the annular groove 50 of the thumb button mechanism's cable knob 49 and to a right latch pin mechanism 33. The left and right latch pin mechanisms are identical in structure and operate in concert 5 with the thumb button mechanism to control the vertical positioning of the auxiliary window 15. Preferably, a tubular insulator guide 55 is placed on each side of the auxiliary window and the cable threaded through each guide. Each latch pin mechanism is spring loaded. It has a shank 60 with a cable attaching knob 61 at a proximal end of the shank, an E clip 62, a stop washer 63, a bushing 64, a pusher spring 65 within the bushing and encompassing a mid-portion of the shank, a frame alignment tab 66 and the latch pin 41 extending from a distal end of the shank. A guide roller 70 mounted on the front frame casing causes the cable which extends vertically down the sides of the window to turn approximately ninety degrees and connect to the shank's knob. In effect, a vertical movement of the thumb button 45 is transmitted to the latch pin 41 to cause it to move substantially horizontally to engage or disengage the detent in the frame wall.

In operation, an occupant of a vehicle wherein the back windshield assembly of the invention is installed merely has to reach over his or her shoulder to grasp the thumb button. A lifting action of the thumb button pulls the cable upwardly and causes the latch pins to move inwardly towards the window. This frees the latch pins from the detents in the frame wall and permits the auxiliary window to lower down into the vehicle by gravity or to be pulled upwardly until the latch pins engage another set of laterally offsetting latch detents at a desired height.

Having described the invention in its preferred embodiment, it should be clear that modifications can be made without departing 5 from the spirit of the invention. It is not intended that the words used to describe the invention nor the drawings illustrating the same be limiting on the invention. It is intended that the invention only be limited by the scope of the appended claims.

I claim:

1. A windshield assembly for use in a back of a vehicle to provide a visual styling effect and to allow access to an area directly behind the windshield assembly, said windshield assembly comprising:

(a) a back windshield for permanent mounting in the vehicle, said back windshield having at least one opening with a curved top edge and two side edges;

(b) an auxiliary window retractably mounted in each said at least one opening of the back windshield, and having a size and having a top edge configured to fully close off said at least one opening in the back windshield, said auxiliary window retractably mounted to move from a fully closed position vertically downwardly to an open position to create a passageway whereby the area behind the windshield assembly is accessible from within the vehicle through said passageway;

(c) a frame casing permanently mounted on said auxiliary window; and (d) a set of frame rails for mounting in the vehicle directly below each said at least one opening in the back windshield and in operable association with the frame casing for slidably receiving the frame casing and the auxiliary window held therein.

2. The windshield assembly of claim 1 wherein the at least one opening in the back windshield is about eight inches to about eighteen inches wide at its base and about ten inches to about twenty inches in height and further its top edge is rounded to form a smooth curve and its side edges extend substantially vertically downwardly.

3. The windshield assembly of claim 1 wherein the at least one opening in the back windshield has an arch-shaped top edge.

4. The windshield assembly of claim 1 wherein said at least one opening is a single opening.

5. The windshield assembly of claim 1 further comprising a manual movement means with a latch system operably associated with the auxiliary window to maintain a selected auxiliary window position.

6. The windshield assembly of claim 1 wherein the frame casing for the auxiliary window includes a front cover plate and a mating back frame support plate.

7. The windshield assembly of claim 6 further comprising a latch system operably associated with the auxiliary window to hold the auxiliary window in the fully closed position in the at least one opening of the back windshield and to allow a vertically downwardly movement of the auxiliary window to an at least partially open position and hold the auxiliary window in the at least partially open position.

8. A windshield assembly for use in a back of a vehicle to provide a visual styling effect and to allow access to an area directly behind the windshield assembly, said windshield assembly comprising:

(a) a back windshield for permanent mounting in the vehicle, said back windshield having at least one opening, said at least one opening having a series of straight edges to form a generally curved top edge;

(b) an auxiliary window retractably mounted in each said at least one opening of the back windshield, and having a size and having a top edge configured to fully close off said at least one opening in the back windshield, further said auxiliary window retractable mounted to move from a fully closed position vertically downwardly to an open position to create a passageway whereby the area behind the windshield assembly is accessible from within the vehicle through said passageway;

(c) a frame casing permanently mounted on said auxiliary window; and (d) a set of frame rails for mounting in the vehicle directly below each said at least one opening in the back windshield and in operable association with the frame casing for slidably receiving the frame casing and the auxiliary window held therein.

9. The windshield assembly of claim 8 wherein the at least one opening in the back windshield has a top edge shaped as a truncated triangle.

10. The windshield assembly of claim 8 wherein said at least one opening is a single opening.

11. The windshield assembly of claim 8 further comprising a manual movement means with a latch system operably associated with the retractable auxiliary window to maintain a selected auxiliary window position.

12. The windshield assembly of claim 8 wherein the frame casing for the auxiliary window includes a front cover plate and a mating back frame support plate.

13. The windshield assembly of claim 12 further comprising a latch system operably associated with the auxiliary window to hold the auxiliary window in the fully closed position in the at least one opening of the back windshield and to allow a vertically downwardly movement of the auxiliary window to an at least partially open position and hold the auxiliary window in the at least partially open position.

14. A windshield assembly for use in a back of a vehicle to allow access to an area directly behind the windshield assembly, said windshield assembly comprising:

(a) a back windshield for permanent mounting in the vehicle, said back windshield having an opening in an approximate mid-section thereof, said opening having an arch-shaped top edge and two side edges and being about eight inches to about eighteen inches wide at its base and about ten inches to about twenty inches in height;

(b) an auxiliary window retractably mounted in the opening in the back windshield, said auxiliary window having a size and having a top edge configured to fully close off the opening in the back windshield, said auxiliary window being mounted to move vertically downwardly to provide a passageway to the area behind the windshield assembly;

(c) a frame casing permanently mounted on the auxiliary window, said frame casing having a front cover plate and a mating back frame support plate;

(d) a set of frame rails for mounting in the vehicle directly below the opening in the back windshield and in operable association with the frame casing for slidably receiving the frame casing and the auxiliary window held therein; and (e) a latch system operably associated with the auxiliary window to hold said auxiliary window in the fully closed position in the opening of the back windshield and to allow a vertically downwardly movement of the auxiliary window to an at least partially open position and hold said auxiliary window in the at least partially open position.

15. The windshield assembly of claim 14 wherein the latch system comprises a first latch pin mechanism operably associated with one of the frame rails, a second latch pin mechanism operably associated with the other of the frame rails, a thumb button mechanism mounted at a top of the frame casing and a cable extending along the frame casing from the first latch pin mechanism to the second latch pin mechanism to connect the first latch pin mechanism, the second latch pin mechanism and the thumb button mechanism whereby movement of the thumb button mechanism pulls said cable to release said first and second latch pin mechanisms and allow movement of the auxiliary window to a desired position.

16. The windshield assembly of claim 15 wherein the auxiliary window has a first bottom corner and an opposed second bottom corner and further the set of frame rails comprises a first frame rail for mounting in the vehicle to receive the first bottom corner of the auxiliary window and a second frame rail for mounting in the vehicle to receive the second bottom corner of the auxiliary window and each of said first and second frame rails has at least two detents to receive one of said first a nd second latch pin mechanisms.

* * * * *